Oct. 29, 1929.  U. W. BRANCHAUD  1,733,397
ELECTRIC WATER HEATER
Filed Nov. 28, 1928
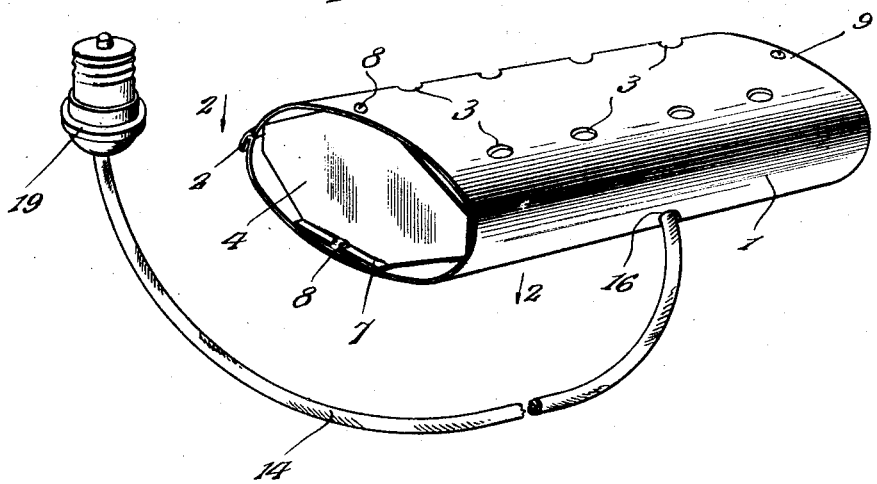
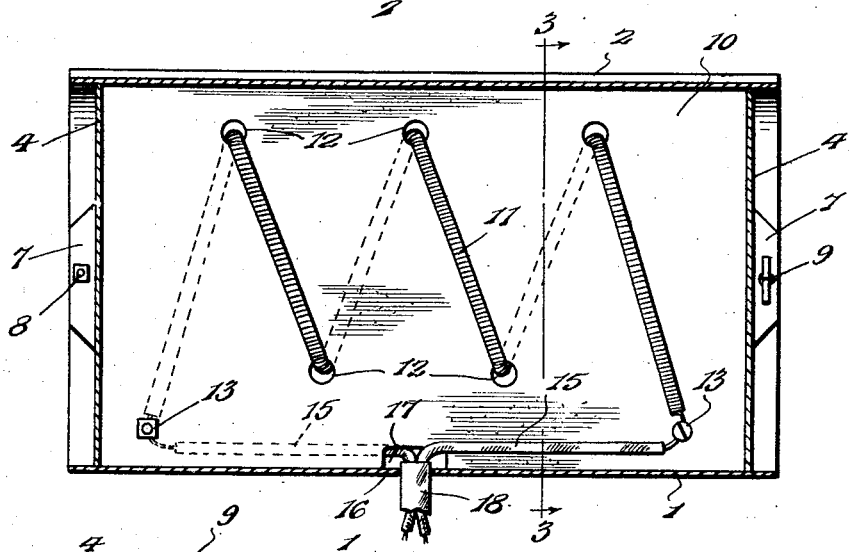
Inventor
U. W. Branchaud.
By Lacey & Lacey, Attorneys Patented Oct. 29, 1929

1,733,397

UNITED STATES PATENT OFFICE

ULRIC W. BRANCHAUD, OF HOLYOKE, MASSACHUSETTS

ELECTRIC WATER HEATER

Application filed November 28, 1928. Serial No. 322,565.

This invention relates to electric appliances and more particularly to a water heater adapted to be placed in a basin or other water container and when electricity is turned on to energize the heater and cause the water to be heated.

One object of the invention is to provide a device of this character including a heating coil carried by a strip of insulation disposed within a casing which supports the strip of insulation and protects the heating coil from being damaged.

Another object of the invention is to so form the casing that it will be very strong and durable and further to so form this casing that water will be permitted to freely circulate through the same when the device is in operation.

Another object of the invention is to provide the casing with heads at its ends which are removably secured and may be easily removed when its is necessary to make repairs or replace a burnt out heating coil.

Another object of the invention is to so form the casing that due to its shape in cross section the strip of insulation carrying the heating coil will be retained in its proper position within the casing and prevent the heating coil from contacting with the metal casing.

The present application constitutes a continuation of the incomplete application deposited by me in the Patent Office June 18, 1928.

The invention is illustrated in the accompanying drawing, wherein

Figure 1 is a perspective view of the improved heater,

Fig. 2 is a longitudinal sectional view through the heater taken on the line 2—2 of Fig. 1, and Fig. 3 is a transverse sectional view taken on the line 3—3 of Fig. 2.

The heater includes a casing 1 formed of sheet metal. The rectangular blank from which the casing is formed has its ends joined by a seam 2 which extends longitudinally of the casing at one side thereof. The casing which is open at its ends is substantially elliptical in cross section, as shown in Fig. 3, and has its opposed walls formed with a suitable number of openings 3 spaced from each other longitudinally and transversely of the casing and of such size that water may freely pass into and out of the casing. Heads 4 are provided for the ends of the casing and each is substantially diamond shaped so that, when the heads are fitted into the casing, the diagonally cut corners 5 will be spaced from the walls of the casing and thereby provide passages 6 through which water may pass. It will thus be seen that by providing the openings 3 and 6 water will be allowed to freely circulate through the casing. Flanges 7 project outwardly from the heads, as shown in Figs. 1 and 2, and through these flanges are passed removable fasteners which may be either short bolts, as shown at 8, or split pins, as shown at 9. By this arrangement the heads will be securely but releasably held in place and while they will ordinarily be prevented from moving out of their proper positions in the ends of the casing they may be easily removed when necessary.

Within the casing is disposed a sheet 10 formed of insulation of any suitable character. This sheet is rectangular in shape, as shown in Fig. 2, and of such length and width that, when in place, its ends are engaged by the heads 4, as shown in Fig. 2, and its side edges bear against the sides of the casing, as shown in Fig. 3. In view of the fact that the casing is substantially elliptical in cross section, the sheet of insulation will be prevented from turning in the casing and, therefore, it will be retained in its proper position. A heating coil 11 is threaded through openings 12 formed in the sheet 10 and extends transversely thereof, as clearly shown in Fig. 2, with its ends engaged with terminal bolts 13 passed through openings formed adjacent opposite ends of the sheet. A cable 14 containing two wires 15 extends into the casing through an opening 16 formed therein and the adjacent edge portion of the sheet of insulation is recessed, as shown at 17, so that the wires which project from the protecting covering 18 of the cable within the casing may extend along opposite faces of the sheet of insulation and connected with the terminal screws 13. At its outer end the cable carries a plug 19 of a conventional construction to be engaged in a light socket.

When the heater is in use, a basin or other receptacle is filled with water to a desired extent and the heater placed in the basin with its plug engaged in a light socket. After the heater has been placed in the basin, the current is turned on and causes the heating coil to become very hot. The water in the basin circulates through the casing and becomes heated very quickly. After the water has been heated to the desired temperature, the current may be shut off and the heater removed. Care should be taken to always place the heater in the water before turning on the current and the current should always be shut off before removing the heater from the water as otherwise the heating coil is liable to be burnt out. When it is necessary to make re-repairs or replace a burnt out heating coil, it is merely necessary to remove one of the heads 4 and the strip of insulation can be withdrawn from the casing. The necessary repairs or replacements can then be made, after which the strip of insulation will be again thrust into the casing and the head replaced.

Having thus described the invention, I claim:

1. A water heater comprising a casing open at its ends, heads for the ends of said casing having flanges secured against the walls thereof, portions of the heads between the flanges being spaced from the walls to form water passages, heating means in said casing, and conductor wires leading from said heating means out of said casing and adapted to be connected with a source of electric energy.

2. A water heater comprising a casing open at its ends, heads for the ends of said casing fitting into the ends of the casing and having flanges removably secured against the walls thereof, portions of the heads between the flanges being spaced from the walls to form water passages, heating means in said casing, and conductor wires leading from said heating means out of said casing and adapted to be connected with a source of electric energy.

3. A water heater comprising a casing open at its ends, said casing being oval in cross section, heads for the ends of said casing formed to define water passages, a strip of insulation fitted into said casing and extending longitudinally therein with its width occupying the longest diameter of the casing and its side edge faces bearing against the walls of the casing, a heating coil carried by said strip of insulation, and conductor wires engaged with the ends of said coil and extending out of the casing and adapted to be connected with a source of electric energy.

4. A water heater comprising a casing open at its end, heads for the ends of said casing having portions spaced from the walls to form water passages, a strip of insulation in said casing formed with openings spaced from each other longitudinally and transversely of the sheet, terminals carried by said sheet, a heating coil threaded through the openings in said sheet and having its ends connected with the terminals, and conductor wires connected with said terminals and passed out of the casing and adapted to be connected with a source of electric energy.

In testimony whereof I affix my signature.

ULRIC W. BRANCHAUD. [L. S.]